United States Patent
Osornio et al.

(10) Patent No.: US 6,509,526 B2
(45) Date of Patent: Jan. 21, 2003

(54) TELEPHONE LEAD-IN CABLE FOR ORDINARY VOICE SERVICE AND HIGH PERFORMANCE DATA AND VIDEO TRANSMISSION SERVICES

(75) Inventors: Victor Osornio Osornio, Qro (MX); Fermin Marquez Arzate, Qro (MX)

(73) Assignee: Servicies Conoumex S.A. Dec.V.

( * ) Notice: Subject to any disclaimer, the term of this patent is extended or adjusted under 35 U.S.C. 154(b) by 0 days.

(21) Appl. No.: 09/804,054

(22) Filed: Mar. 13, 2001

(65) Prior Publication Data

US 2002/0003047 A1 Jan. 10, 2002

(30) Foreign Application Priority Data

Jul. 7, 2000 (MX) .............................................. 006723

(51) Int. Cl.[7] ................................................ H01B 7/00
(52) U.S. Cl. ............................. 174/117 F; 174/117 FF
(58) Field of Search ....................... 174/110 R, 113 R, 174/117 F, 117 FF, 36

(56) References Cited

U.S. PATENT DOCUMENTS

| | | | | |
|---|---|---|---|---|
| 2,950,338 A | * | 8/1960 | Taylor | 174/40 |
| 3,060,260 A | * | 10/1962 | Scofield | 174/117 |
| 4,220,812 A | * | 9/1980 | Ney et al. | 174/117 F |
| 4,467,138 A | * | 8/1984 | Brorein | 174/115 |
| 4,729,628 A | * | 3/1988 | Kraft et al. | 350/96.23 |
| 4,761,053 A | * | 8/1988 | Cogelia et al. | 350/96.23 |
| 4,801,764 A | * | 1/1989 | Ohlhaber | 174/70 C |
| 5,180,890 A | * | 1/1993 | Pendergrass et al. | 174/117 F |
| 6,259,843 B1 | * | 7/2001 | Kondo | 385/104 |

* cited by examiner

*Primary Examiner*—Dean A. Reichard
*Assistant Examiner*—William H. Mayo, III
(74) *Attorney, Agent, or Firm*—Jonathan Grant; Grant Patent Services

(57) ABSTRACT

A telephone lead in cable for high performance voice, video, data transmission, and lead in services, having a generally rectangular shaped housing made of thermoplastic material, a data transmission circuit, capable of transmitting data at high speeds, that has two metal wires which are helically twisted about one another, a fusion protection thin band made of heat resistant material that is applied helically or longitudinally on the two metal wires, wherein the two metal wires are positioned to run through the center of the housing, and a circuit element for voice transmission having two metal conductors that are parallel to each other and positioned on an opposite side of the centrally located helically twisted thermoplastic covered wires.

16 Claims, 3 Drawing Sheets

TELEPHONE LEAD-IN CABLE FOR ORDINARY VOICE SERVICE AND HIGH PERFORMANCE DATA AND VIDEO TRANSMISSION SERVICES

BACKGROUND OF THE INVENTION

1. Field of the Invention

The instant invention relates to a telephone lead-in cable SVDL type (voice, video, data, and lead-in) permitting the connection of the users to the public telephone system with a high speed digital services link, besides the analog services currently offered. This is obtained through the integration of a balanced circuit to the original design of two parallel metal elements also serving as self-supporting elements.

2. Description of the Prior Art

Generally, the air lead-ins of unitary telephone services have been limited with regard to bandwidth and radio-interference resistance because of their design. The demand for transmission means capable of supporting a bandwidth large enough to meet the growing demand for digital services in the coming years also requires designs that do not increase the cost or limit the installation ease of the current products. Besides, in the case of cables used for the connection of users to the telephone network, the design is a decisive factor. The cable must be light and economical, must be capable of allowing data transmission and speeds higher than 155 Mbps, but must also present an acceptable response in frequencies over 100 MHz and support its own weight in spans of more than 100 meters. The cable must also be weather resistant and, in windy and icy conditions, the design must allow for reinforcement without having to change its shape, in such a way that the same anchor elements can be used in this type of services.

Among the known techniques to overcome the above mentioned problems, U.S. Pat. No. 4,467,138 describes a "lead cable for plural communication" the design of which is related to a flat construction communication conductor having two or more communication ports, polyolefin insulated cables, assembled lengthwise, placed in groups on opposite sides and parallel to a conductive steel wire.

Even though cables presenting twisted pair conductors are known, not all them have the same application, i.e. according to the use, the design and even the number of lays of the twisted pair vary on a case per case basis. For example, U.S. Pat. No. 6,064,008, describes a communication cable having two pairs of twisted conductors, the main characteristic of which is not the twisted pairs but the insulating filing material based on a fluorinated polymer with a blowing agent.

SUMMARY OF THE INVENTION

The applicant has developed a SVDL type lead-in cable the novel characteristic of which is that its design permits two transmission circuits using one of them as self-supporting element for air lead-ins and voice signal transmission; the other circuit permitting, if necessary, to have a service dedicated to high speed digital signal transmission without interfering in any way with the voice service signals or having to use additional electronic circuit to separate the signals. The design is also highly near end crosstalk (NEXT) resistant between the two circuits.

BRIEF DESCRIPTION OF THE DRAWINGS

Hereinbelow the invention will be described according to a the drawings corresponding to FIGS. 1 to 3 wherein.

DETAILED DESCRIPTION OF THE INVENTION

Figure 1:
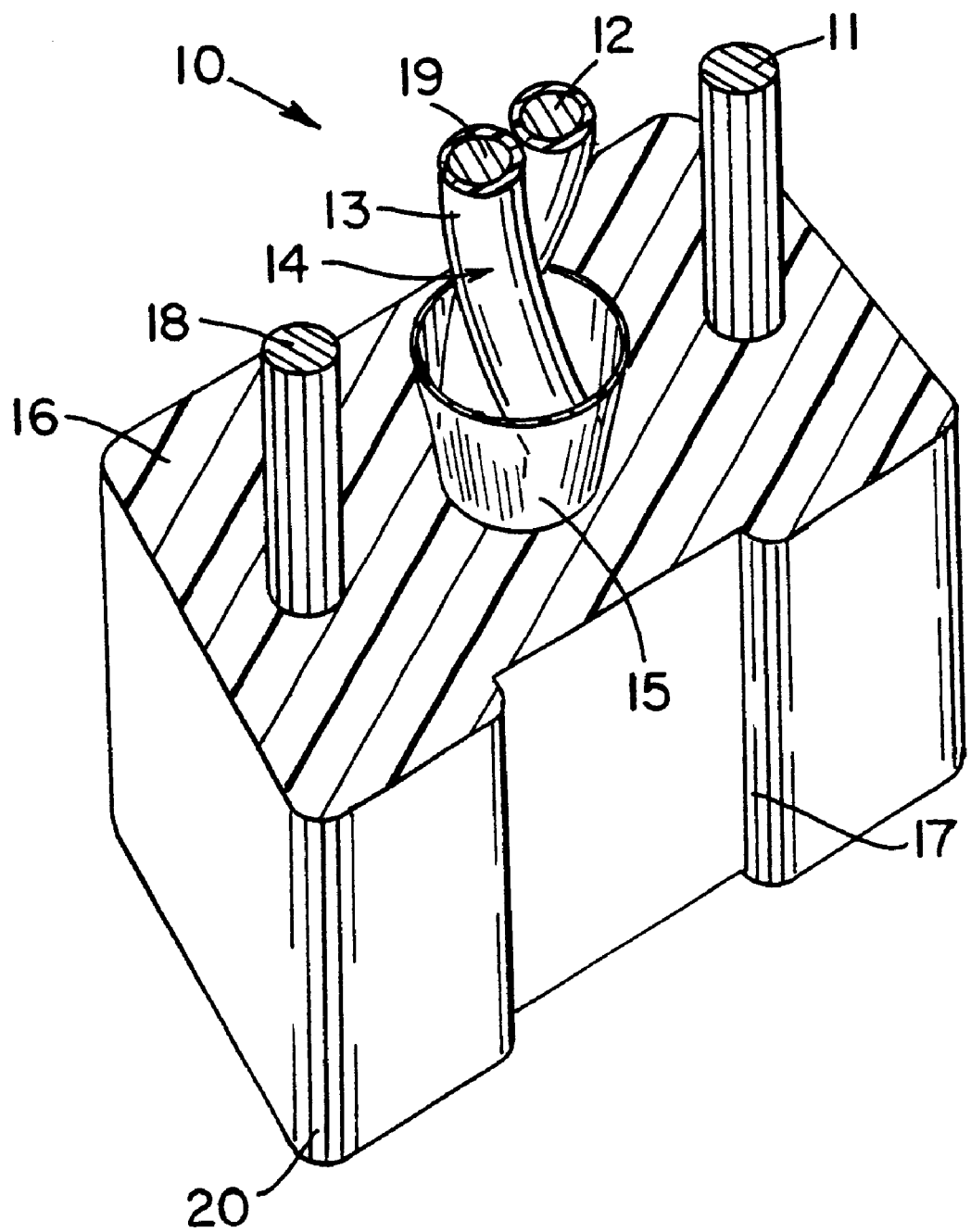
FIG. 1 is an isometric view with cross section of the telephone lead-in cable for high performance in data transmission and ordinary voice service (SVDL), showing the sections of said cable.
Figure 2:
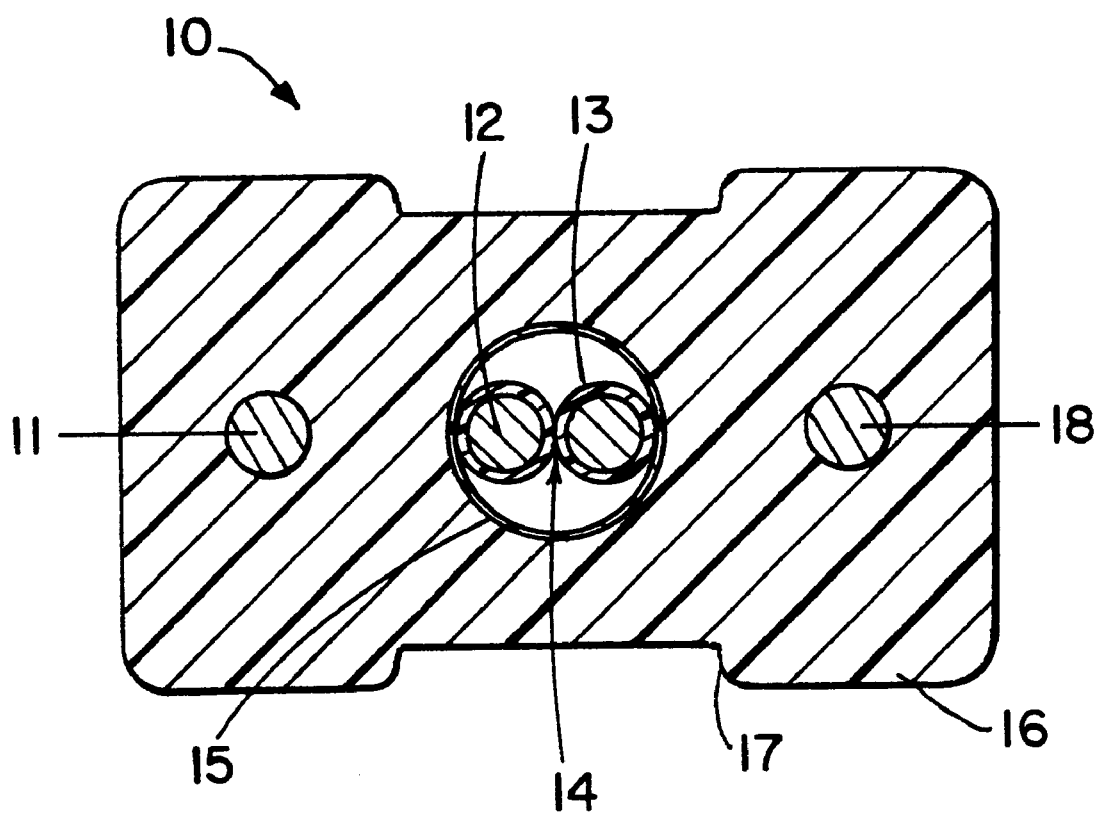
FIG. 2 is a cross section view of FIG. 1, showing the placement of the two transmission circuits in only one cable.
Figure 3:
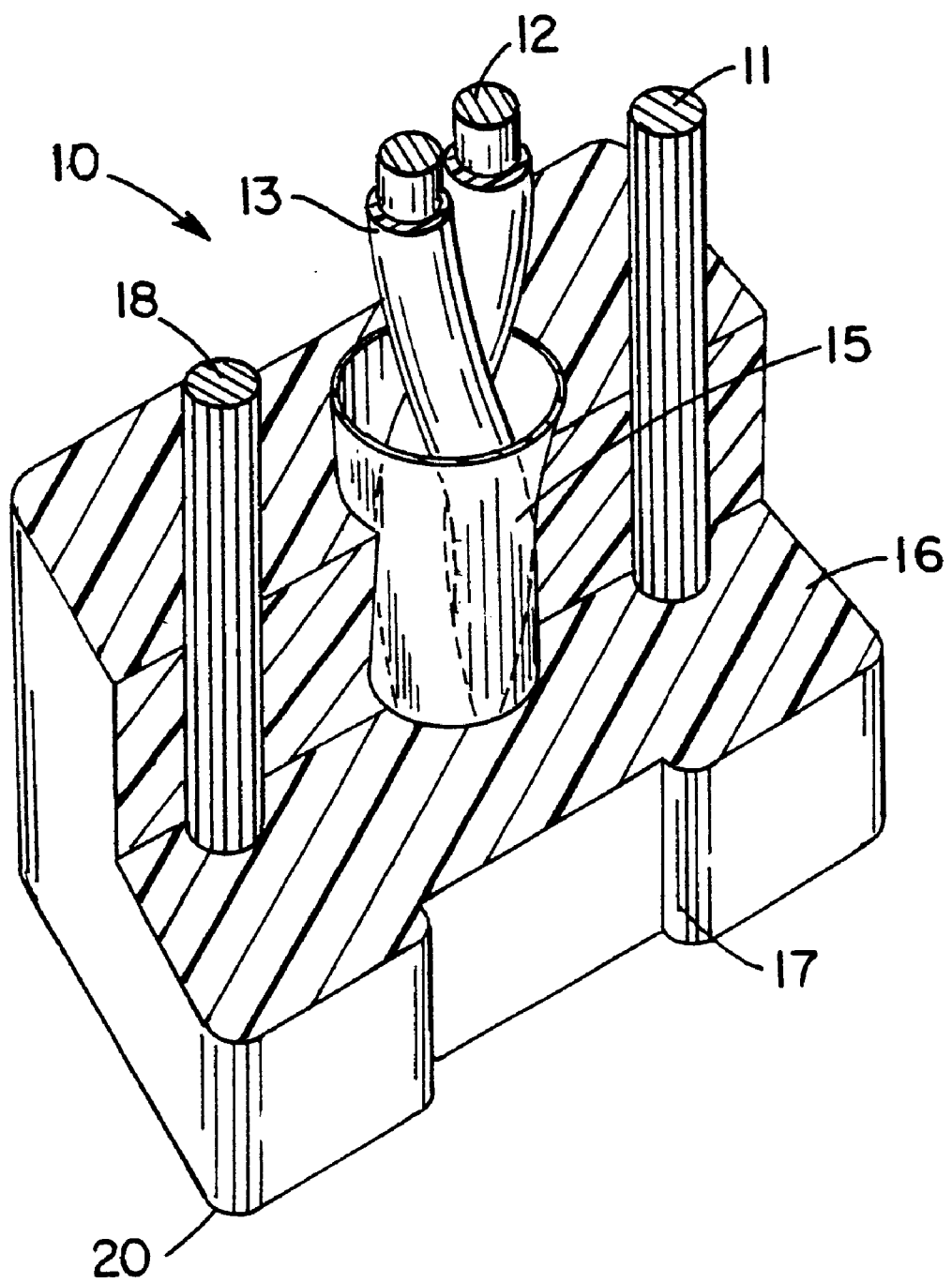
FIG. 3 is a cross section view of FIG. 1, showing the helicoidal asssembly of the fusion protection tape.

The SVDL (voice, video, data, lead-in) type lead-in cable 10 is characterized because it is formed by two metal elements permitting it to be self-supporting in air lead-ins 11, 18, and also to transmit voice signals since, together, they form a circuit to transmit analog signals; a circuit permitting data transmission at relatively high speeds formed by two metal wires 12 and 19 individually insulated by a thermoplastic compound 13 made of polyethylene or polypropylene and twisted together forming a 100 ohm impedance balanced circuit 14 characterized because it is highly resistant to the NEXT that could be generated by the combination of these elements in the same transmission plane. The twisted pair 14 or balanced circuit is covered by a very thin mylar tape 15 made of a material resisting at temperatures up to 240° C., the two circuits are covered by a thermoplastic material 16 tape protecting against the environment and serving also to integrate them in a body in order to facilitate the handling and permitting the installation in spans over 100 meters long. The shape of the cable 17 allows the cable to be submitted to tension or go compression by the anchor elements without any mechanical damage to the transmission components that could deteriorated the electrical characteristics.

(SVDL) Lead-in Cable FIG. 1

The cable object of the instant invention 10, is an elongated body of rectangular shape at the end of which 20 corner pieces are rounded in order to provide better installation conditions. It also has, in its lateral ends, in the middle part, lowered areas to form a semi-rectangular geometrical shape. Equidistantly in its structure, the lead-in cable has two transmission circuits not requiring for installation any type of special fittings for attachment to the post or terminal distribution box of the telephone network and the house of the telephone service subscriber or user. The circuit elements for voice transmission 11 are made of metal cylindrical conductors not limited in their composition and cross section, i.e., the elements could be made of metal alloys or compositions of two tempered metals with a treatment permitting to obtain a high breaking stress, since said elements are also destined to be self-supporting and to support other elements forming the cable. However, the thermal treatment to which they are submitted must be from 45° C. to 550° C. so that said conductors or self-supporting metal elements of the cable do not substantially lose their resistance characteristics during the passage of electrical current. Said elements 11 are placed longitudinally, parallel one to the other, and separated by a 4 to 6 mm distance permitting to place the second transmission circuit 14 between them. Said circuit elements are placed in such a way as to provide an appropriate means to transmit digital signal 12 at relatively high speeds (155 Mbps) and are constituted by metal conductors of a nearly cylindrical shape, made of 100% pure annealed soft copper and stranded with a smooth surface of a diameter (0.5 to 0.64 mm) permitting to cover distances spanning up to 150 m and with relatively low losses 22 Db/100 at 100 MHz. Each one of the conductors is individually insulated with a thermoplastic compound layer 13 applied continuously and highly uniform, insuring that the concentricity of the insulating material with regard to the conductor is higher than 90%. Said insulation can be applied in only one layer or in several layers and each one of the insulating layers is colored to facilitate its identification. The material used for the layers can be solid, expended by means of physical or chemical action or have compounds retarding or inhibiting flame propagation. The conductors insulated in such a way are twisted 14, forming a pair or balanced circuits. The distance between each strand of the conductor is such that it permits to minimize NEXT effects caused by the nearness of the other element emitting electromagnetic signals and, in turn, lowers also the energy emission towards the other circuit. The twisted pair 14 shows an optimal performance because the control of the wall thickness and the helix of each one of the conductors twisted to form the pair insure a characteristic impedance stability at relatively high frequencies. Besides, the circuit is maintained in an excellent electrical balance, minimizing thus the interference of external agents: the balanced circuit or twisted pair is covered by a fusion protection thin band, made of heat resistant material 15, applied helicoidally or longitudinally on said twisted pair. The band prevents the fusion of the insulating material elements among them and/or between the cover compound during the application of the external cover 16 through an extrusion process and due to heat transfer from the compound to the insulated conductors. Said band also acts as a barrier in order not to allow the invasion of the transmission area of the balanced circuit by the cover compound and the modification of its dielectric constant, and, in turn, its characteristic impedance which causes an increased circuit loss because of a higher capacitance, a strengthened cover because its design based on a thermoplastic cover 18 forming an integral body and maintaining the self-supporting elements on each side, in parallel, diametrically opposite the twisted pair.

The cover 18 protects both elements against mechanical abuse to which they could be submitted during warehousing, transportation and installation. The cover compound is weatherproof in the environment in which it will be installed and also protects the circuits against premature aging caused by solar action, water, or any other external agent. Said compound can also be flame retardant if it is required in the place where the cable is installed.

The cable body design has a rectangular shape 17 with trimmed edges 20, permitting that the product be installed using any of the current clamping fittings. It also prevents damage to the components caused by tension or compression stresses to which they are submitted during the installation and daily operation.

One advantage of the cable design is its tensile strength, i.e. the increase of the installation span can be solved through cross section changes of supporting elements or through modifications regarding the type of material used.

We claim:

1. A telephone lead in cable for high performance voice, video, data transmission and lead in services, comprising:
   a generally rectangular shaped housing, said housing having two short sides and two long sides, said housing comprising a thermoplastic material;
   a data transmission circuit capable of transmitting high speeds, said data transmission circuit comprising:
   a) two metal wires, each of said metal wires being helically twisted about another one of said metal wires to form helically twisted metal wires
   b) at least one thermoplastic compound layer, said thermoplastic compound layer coating each of said helically twisted said metal wires to form helically twisted thermoplastic covered wires;
   c) a fusion protection thin band made of heat resistant material, able to resist temperatures of up to 240° C., said band applied helically or longitudinally on said helically twisted thermoplastic covered wires, said helically twisted thermoplastic covered wires being positioned and running through a center of said housing to form centrally located helically twisted thermoplastic covered wires; wherein the data transmission circuit has a characteristic impedance of 100 ohms; and further comprises,
   a circuit element for voice transmission, said circuit element comprising;
   a) two metal conductors, parallel to each other, each one of said metal conductors being positioned on an opposite side of said centrally located helically twisted thermoplastic covered wires.

2. The telephone lead in cable of claim 1, wherein said two metal conductrs form a circuit for the transmission of analog signals.

3. The telephone lead in cable of claim 1, wherein said data transmission circuit is transmitting digital signal data at speeds up to about 155 Mbps.

4. The telephone lead in cable of claim 3, wherein data transmission circuit is pelically coiled with a smooth surface having a helical diameter of 0.5–0.64 mm.

5. The telephone lead in cable of claim 1, wherein said cable may span up to 150 meters.

6. The telephone lead in cable of claim 1, wherein each of said metal conductors of said circuit element for voice transmission is insulated with an insulating material, said insulating material being an insulating thermoplastic layer wherein a concentricity of a wall of the insulating material is higher than 90 percent compared to one of said metal conductors.

7. The telephone lead in cable of claim 6, wherein said insulating material is colored for identification purposes.

8. The telephone lead in cable of claim 1, wherein each of said two long sides have indentations.

9. A telephone lead in cable for high performance voice, video, data transmission and lead in services, comprising:
   a generally rectangular shaped housing, said housing having two short sides and two long sides, said housing comprising a thermoplastic material;
   a data transmission circuit capable of transmitting high speeds, said data transmission circuit comprising:
   a) two metal wires, each of said metal wires being helically twisted about another one of said metal wires to form helically twisted metal wires
   b) at least one thermoplastic compound layer, said thermoplastic compound layer coating each of said helically twisted said metal wires to form helically twisted thermoplastic covered wires;
   c) a fusion protection thin band made of heat resistant material, able to resist temperatures of up to 240° C., said band applied helically or longitudinally on said helically twisted thermoplastic covered wires, said helically twisted thermoplastic covered wires being positioned and running through a center of said housing to form centrally located helically twisted thermoplastic covered wires; wherein the data transmission circuit transmits a digital signal data at speeds up to about 155 Mbps; and further comprises, a circuit element for voice transmission, said circuit element comprising;
  a) two metal conductors, parallel to each other, each one of said metal conductors being positioned on an opposite side of said centrally located helically twisted thermoplastic covered wires.

10. The telephone lead in cable of claim 9, wherein said data transmission circuit has a characteristic impedance of 100 ohms.

11. The telephone lead in cable of claim 9, wherein said two metal conductors form a circuit for the transmission of analog signals.

12. The telephone lead in cable of claim 9, wherein data transmission circuit is pelically coiled with a smooth surface having a helical diameter of 0.5–0.64 mm.

13. The telephone lead in cable of claim 9, wherein said cable may span up to 150 meters.

14. The telephone lead in cable of claim 9, wherein each of said metal conductors of said circuit element for voice transmission is insulated with an insulating material, said insulating material being an insulating thermoplastic layer wherein a concentricity of a wall of the insulating material is higher than 90 percent compared to one of said metal conductors.

15. The telephone lead in cable of claim 14, wherein said insulating material is colored for identification purposes.

16. The telephone lead in cable of claim 9, wherein each of said two long sides have indentations.

* * * * *